United States Patent
Muramatsu et al.

(10) Patent No.: US 11,367,175 B2
(45) Date of Patent: Jun. 21, 2022

(54) IN-VEHICLE STEREO CAMERA

(71) Applicant: Hitachi Automotive Systems, Ltd., Hitachinaka (JP)

(72) Inventors: Shouji Muramatsu, Ibaraki (JP); Takeshi Shima, Ibaraki (JP); Makoto Kudo, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/975,461

(22) PCT Filed: Mar. 11, 2019

(86) PCT No.: PCT/JP2019/009580
§ 371 (c)(1),
(2) Date: Aug. 25, 2020

(87) PCT Pub. No.: WO2019/181591
PCT Pub. Date: Sep. 26, 2019

(65) Prior Publication Data
US 2021/0019877 A1 Jan. 21, 2021

(30) Foreign Application Priority Data
Mar. 22, 2018 (JP) .............................. JP2018-055255

(51) Int. Cl.
*G06K 9/00* (2022.01)
*G06T 7/00* (2017.01)
*G06T 7/73* (2017.01)

(52) U.S. Cl.
CPC .............. *G06T 7/0008* (2013.01); *G06T 7/73* (2017.01); *G06T 2207/10012* (2013.01); *G06T 2207/30168* (2013.01); *G06T 2207/30252* (2013.01)

(58) Field of Classification Search
CPC ..................... G06T 7/0008; G06T 7/73; G06T 2207/10012; G06T 2207/30168;
(Continued)

(56) References Cited

U.S. PATENT DOCUMENTS

2015/0036886 A1* 2/2015 Matono .................. G08G 1/166
382/106
2016/0007018 A1 1/2016 Ooi
(Continued)

FOREIGN PATENT DOCUMENTS

JP 2002-032746 A 1/2002
JP 2002-259966 A 9/2002
(Continued)

OTHER PUBLICATIONS

International Search Report with English translation and Written Opinion issued in corresponding application No. PCT/JP2019/009580 dated Jul. 9, 2019.

*Primary Examiner* — Sean M Conner
*Assistant Examiner* — Han Hoang
(74) *Attorney, Agent, or Firm* — Foley & Lardner LLP

(57) ABSTRACT

Provided is an in-vehicle stereo camera which enables the continuation of automated driving if failures occur during imaging. A pair of captured images 301, 302, which is captured by a pair of imaging units so that both contain an overlapping region, are acquired (S201), it is determined whether an abnormal region is present in at least one of the pair of captured images, and if an abnormal region is present, the degree of impact from the abnormal region on an object recognition process of an object recognition unit is diagnosed (S202), and the processing content of the object recognition process is updated according to the degree of impact (S203).

6 Claims, 13 Drawing Sheets

(58) Field of Classification Search
CPC . G06T 2207/30252; G06T 2207/10021; G06T 2207/30261; G06T 7/593
See application file for complete search history.

(56) References Cited

U.S. PATENT DOCUMENTS

| | | | | |
|---|---|---|---|---|
| 2017/0032517 A1* | 2/2017 | Akasaka | ............... | B60R 1/00 |
| 2017/0136961 A1 | 5/2017 | Harada | | |
| 2018/0165529 A1* | 6/2018 | Ishigami | ............ | G06T 7/593 |

FOREIGN PATENT DOCUMENTS

| | | | |
|---|---|---|---|
| JP | 2002-374524 | A | 12/2002 |
| JP | 2016-015638 | A | 1/2016 |
| JP | 2017-092752 | A | 5/2017 |
| JP | 2017-161491 | A | 9/2017 |

* cited by examiner

FIG. 8

| OBJECT ID | POSITION | SIZE |
|---|---|---|
| 1 | X1, Y1, Z1 | S1 |
| 2 | X2, Y2, Z2 | S2 |
| 3 | X3, Y3, Z3 | S3 |
| 4 | X4, Y4, Z4 | S4 |
| 5 | X5, Y5, Z5 | S5 |

(a)

| OBJECT ID | POSITION | SIZE |
|---|---|---|
| 1 | X1, Y1, Z1 | S1 |
| 2 | X2, Y2, Z2 | S2 |
| 3 | OBJECTS 3, 4 ARE NOT DETECTED DUE TO STAIN | |
| 4 | | |
| 5 | X5, Y5, Z5 | S5 |

(b)

| OBJECT ID | POSITION | SIZE |
|---|---|---|
| 1 | X1, Y1, Z1 | S1 |
| 2 | X2, Y2, Z2 | S2 |
| 3 | Xa3, Ya3, Za3 | Sa3 |
| 4 | Xa4, Ya4, Za4 | Sa4 |
| 5 | X5, Y5, Z5 | S5 |

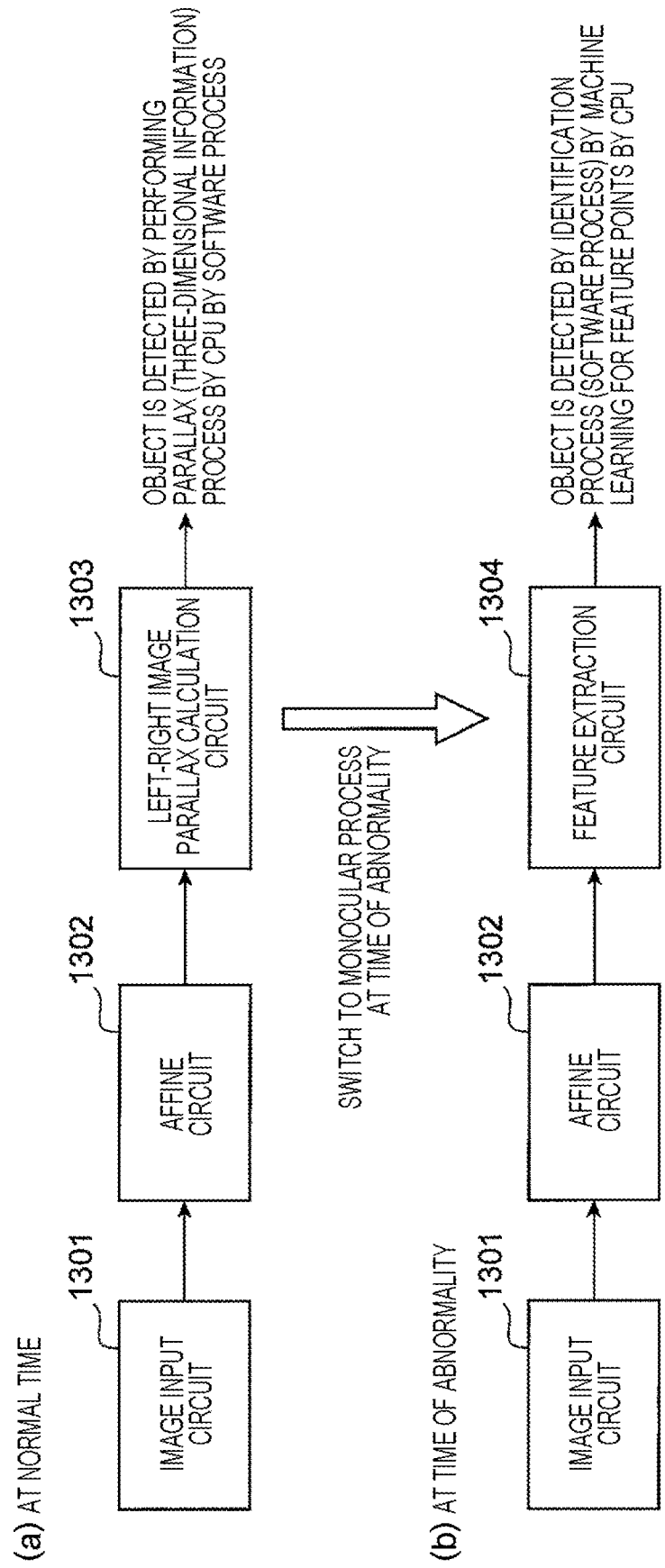

IN-VEHICLE STEREO CAMERA

TECHNICAL FIELD

The present invention relates to an in-vehicle stereo camera.

BACKGROUND ART

PTL 1 describes a technique to acquire captured images respectively captured in a plurality of imaging devices so as to contain overlapping regions, extract the overlapping regions respectively in the acquired plurality of captured images, extract an image feature in each of the plurality of extracted overlapping regions, further compare image features in the plurality of overlapping regions, determine whether or not these image features are similar, and determine that the imaging device has a failure if they are not similar. Then, it is described that if there is a camera identified as having a failure, fail-safe setting is performed, and an instruction not to use a captured image by the camera having a failure is output.

CITATION LIST

Patent Literature

PTL 1: JP 2016-15638 A

SUMMARY OF INVENTION

Technical Problem

For example, when a blocking matter adheres to a stereo camera while performing autonomous driving based on sensing information from the stereo camera and the view is obstructed, or also when the stereo camera fails, it is required to maintain sensing functions necessary for traveling control and continue autonomous driving until the driver takes over the driving.

The present invention has been made in view of the above points, and it is an object thereof to provide an in-vehicle stereo camera that can continue autonomous driving when a problem occurs in imaging.

Solution to Problem

An in-vehicle stereo camera according to the present invention that solves the above-mentioned problems includes: a captured image acquisition unit that acquires a pair of captured images captured by a pair of imaging units so that both contain an overlapping region; an object recognition unit that performs an object recognition process that recognizes an object using the pair of captured images; and a degree-of-impact diagnosis unit that determines whether or not an abnormal region exists in at least one of the pair of captured images and diagnoses, when the abnormal region exists, a degree of impact exerted by the abnormal region on the object recognition process of the object recognition unit, in which the object recognition unit changes a processing content of the object recognition process according to the degree of impact.

Advantageous Effects of Invention

According to the present invention, it is possible to acquire an in-vehicle stereo camera capable of continuing autonomous driving when a problem occurs in imaging. Further features related to the present invention will be apparent from the description of the present description and the accompanying drawings. Furthermore, problems, configurations, and effects other than those described above will be clarified by the following description of embodiments.

BRIEF DESCRIPTION OF DRAWINGS

FIG. 8 is a diagram describing an example of a table that is operating normally.

FIG. 13 is a diagram describing a method of switching a hardware configuration at a time of abnormality.

DESCRIPTION OF EMBODIMENTS

Hereinafter, an embodiment of the present invention will be described using the drawings.

Figure 1:
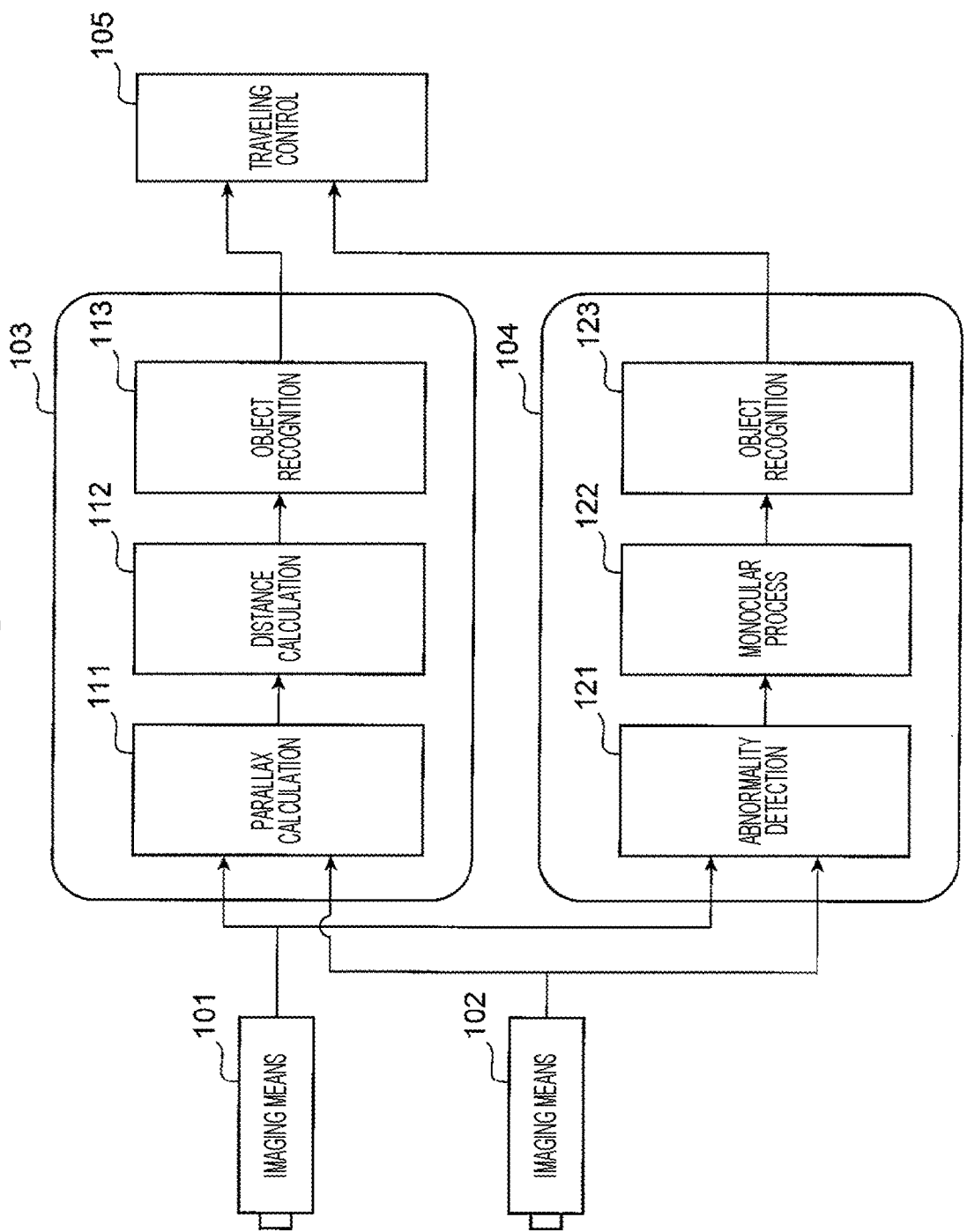
FIG. 1 is a functional block diagram describing a configuration of an in-vehicle stereo camera according to a first embodiment of the present invention.

FIG. 1 is a functional block diagram describing a configuration of an in-vehicle stereo camera according to the embodiment of the present invention.

The in-vehicle stereo camera according to the present embodiment is mounted on an own vehicle and has a configuration for performing object recognition of a pedestrian, other vehicle, or the like based on an image obtained by imaging forward of the own vehicle. The information of object recognition detected by the in-vehicle stereo camera is output to the traveling control unit 105 of the own vehicle and used for various vehicle traveling controls such as automatic braking control, automatic traveling control, or automatic parking control.

As illustrated in FIG. 1, the in-vehicle stereo camera has a pair of imaging units (imaging means) 101, 102 and a control unit. The pair of imaging units 101, 102 images forward of the vehicle so that both contain an overlapping region. Although the pair of imaging units 101, 102 is configured integrally with the in-vehicle stereo camera in the present embodiment, it may be provided separately from the in-vehicle stereo camera and configured to supply captured images to the in-vehicle stereo camera.

The control unit has a first object recognition unit 103 that performs object recognition by stereoscopic vision at a normal time, and a second object recognition unit 104 that performs object recognition by monocular vision at a time of abnormality. The first object recognition unit 103 has a means 111 that calculates a parallax from a pair of captured images, a means 112 that calculates a distance from the parallax, and a means 113 that performs object recognition from distance information. The second object recognition unit 104 has a means 121 that detects an abnormality in the captured image captured by either one of the imaging units, a means 122 that performs a monocular process using the captured image captured by the other of the imaging units, and a means 123 for performing object recognition based on a result thereof.

Figure 2:
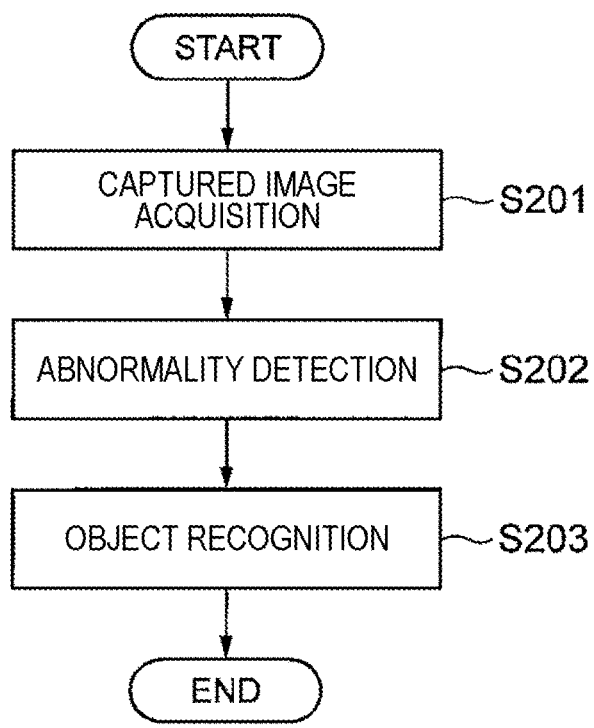
FIG. 2 is a flowchart describing a control process of the in-vehicle stereo camera according to the first embodiment of the present invention.

FIG. 2 is a flowchart describing a control process of the in-vehicle stereo camera according to the present embodiment.

In the control unit, first, a captured image acquisition process (S201) of acquiring a pair of captured images captured by the pair of imaging units so that both contain an overlapping region is performed. Then, an abnormality detection process (S202) of detecting whether or not at least one of the pair of captured images has an abnormality is performed. In the abnormality detection process of S202, it determined whether or not an abnormal region exists in at least one of the pair of captured images, and if the abnormal region exists, a degree-of-impact diagnosis process is performed to diagnose the degree of impact exerted by the abnormal region on an object recognition process of the object recognition unit. Then, an object recognition process (S203) to recognize an object using the pair of captured images is performed. In the object recognition process of S203, a process of changing the processing contents of the object recognition process according to the degree of impact diagnosed by the degree-of-impact diagnosis process is performed.

Figure 3:
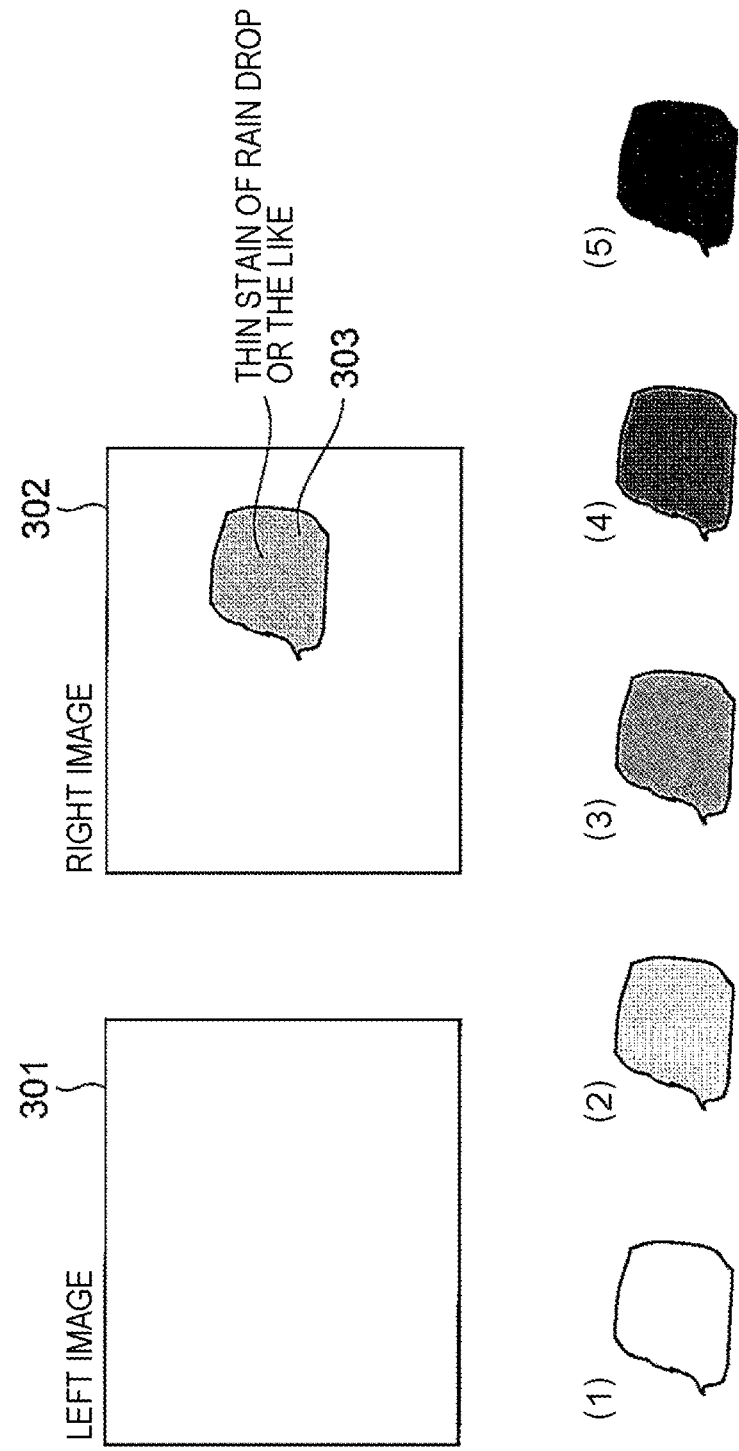
FIG. 3 is a diagram describing a specific example of a method of diagnosing a degree of impact of abnormality by an abnormality detection process.

FIG. 3 is a diagram describing a specific example of a method of diagnosing the degree of impact of abnormality by the abnormality detection process.

In the example illustrated in FIG. 3, out of the pair of left and right captured images, a right image 302 has a stain 303, and a left image 301 has no stain. In such a case, it is determined by the abnormality detection process that the right image 302 has an abnormality and an abnormal region exists. Then, in order to diagnose the degree of impact in object recognition, the left image 301 and the right image 302 are compared with each other to estimate a size and transparency of the stain 303. The degree of impact is affected by the size and transparency of the stain 303. The greater the stain or the lower the transparency, the greater the degree of impact, and the smaller the stain or the higher the transparency, the smaller the degree of impact.

In the abnormality detection process, the difference between the left image 301 and the right image 302 is calculated, and if the difference between stain portions is large, it can be determined that the stain 303 is attached. For example, an obvious stain of mud, dust, or the like can be detected from a single image by a monocular camera, but it is difficult to detect a thin stain of a raindrop or the like attached to the camera lens. On the other hand, since the stereo camera can acquire two left and right similar images, it is possible to detect a thin stain.

For example, when the degree of transparency of a stain is high as in a case of transparency (1), there is less false detection or non-detection of an object in the object recognition process, and thus it is diagnosed that the degree of impact is small. Further, when transparency of a stain is low as in transparency (5), the possibility of false detection or non-detection of an object in the object recognition process increases. That is, the risk of false detection or non-detection is high, and the degree of impact is diagnosed to be large. The stain 303 on the right image 302 illustrated in FIG. 3 is a thin stain such as a raindrop and corresponds to transparency (3).

Figure 4:
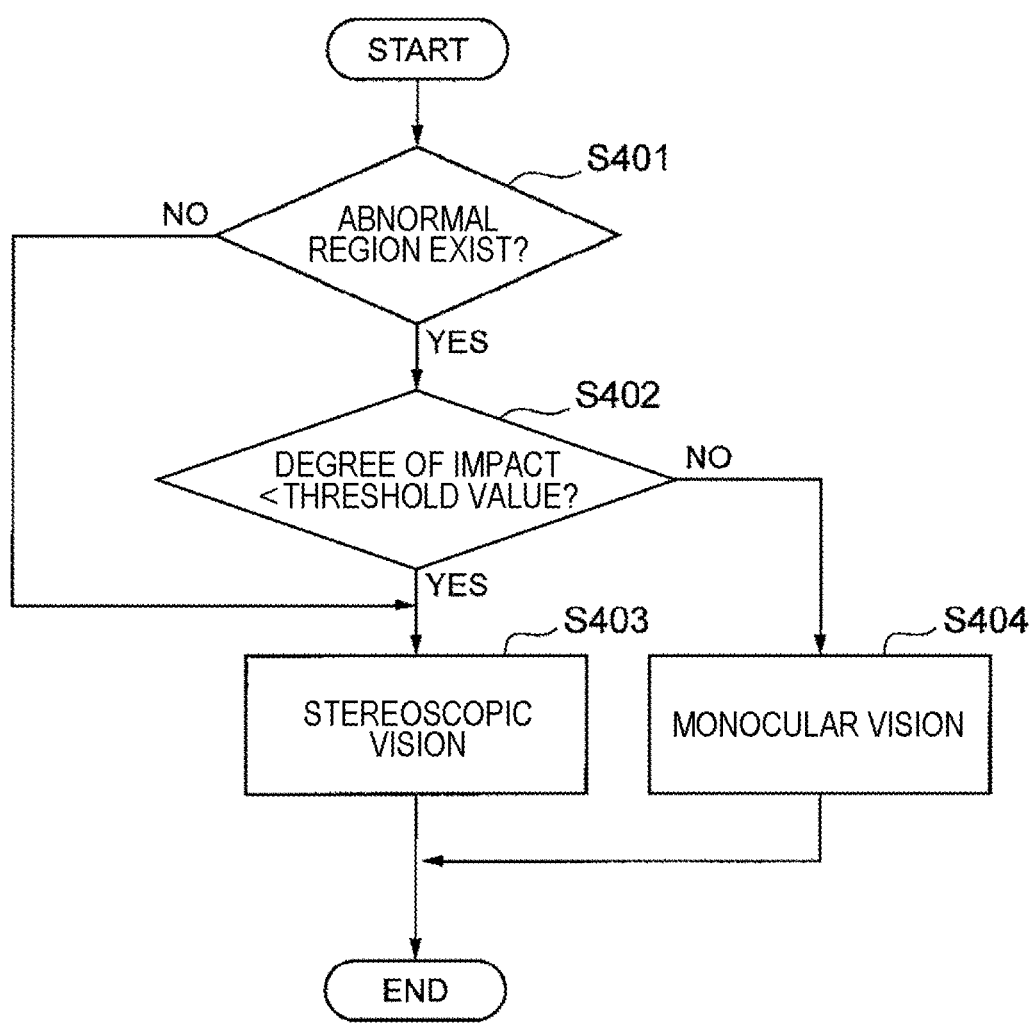
FIG. 4 is a flowchart describing contents of an object recognition process.

FIG. 4 is a flowchart describing the contents of the object recognition process in S203.

In the object recognition process, the processing contents of the object recognition process are changed according to the degree of impact diagnosed by the degree-of-impact diagnosis process. For example, in step S401, it is determined whether or not there is an abnormal region. Then, when there is no abnormal region (NO in S401), the process proceeds to step S403, and object recognition by stereoscopic vision using a pair of captured images is performed.

On the other hand, if there is an abnormal region (YES in S401), the process proceeds to step S402 and thereafter in order to diagnose the degree of impact. In step S402, it is determined whether or not the degree of impact is smaller than a preset threshold value, and when it is diagnosed that the degree of impact is smaller than the preset threshold value (YES in S402), the process proceeds to step S403, where object recognition is performed by stereoscopic vision using a pair of captured images.

Then, if the degree of impact is diagnosed to be equal to or higher than the threshold value (NO in S402), the process proceeds to step S404, and object recognition process by monocular vision using only the other of the captured images is performed. For example, when the transparency (3) illustrated in FIG. 3 is set as a threshold value, the transparency (1) and the transparency (2) are smaller than the threshold value, and therefore the object recognition process by stereoscopic vision of the left image 301 and the right image 302 is performed. Since the transparencies (3) to (5) are greater than or equal to the threshold value, the object recognition process by monocular vision of the left image 301 is performed.

According to the object recognition process described above, when one of the captured images has an abnormality and the degree of impact thereof is equal to or greater than the threshold value, the content of the object recognition process is changed from the stereoscopic vision using a pair of captured images to the monocular vision using only the other captured image. Thus, recognition performance may decrease, but the minimum function can be maintained and the object recognition can be continued. Therefore, when a blocking matter adheres to the stereo camera during autonomous driving based on sensing information from a stereo camera and the view is obstructed, or also when the stereo camera fails, it is possible to maintain sensing functions necessary for traveling control and continue autonomous driving until the driver takes over the driving.

Figure 5:
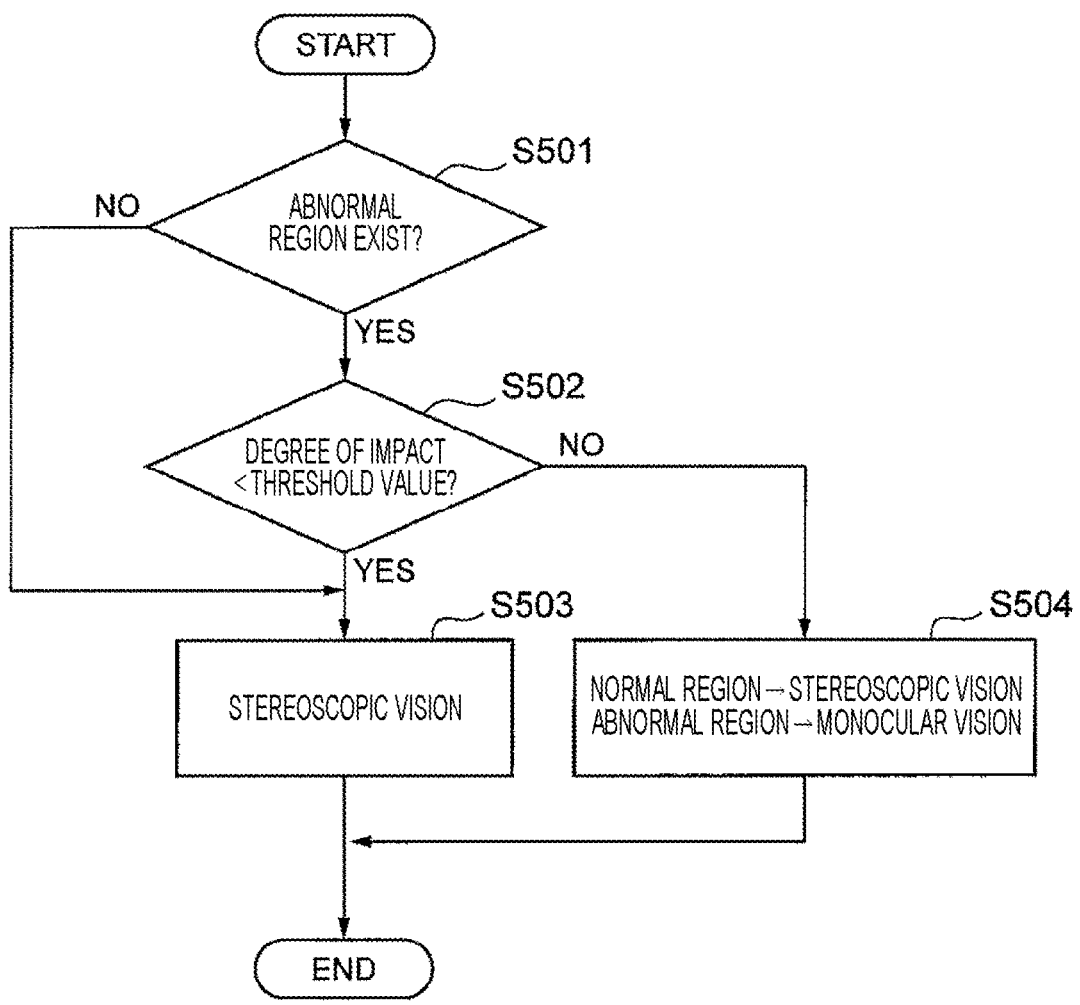
FIG. 5 is a flowchart describing another example of the object recognition process.

FIG. 5 is a flowchart describing another example of the object recognition process, which corresponds to FIG. 4.

A feature of this example is a configuration in which only an abnormal region of a captured image is complemented by the object recognition process by monocular vision. The processing contents from step S501 to step S503 are the same as step S401 to step S403 of this example illustrated in FIG. 4. In step S504, there are performed object recognition by stereoscopic vision using an image of a normal region excluding an abnormal region from one of captured images and an image that is the other captured image and is of a normal region corresponding to the normal region of the one captured image, and object recognition by monocular vision using an image that is the other captured image and is of a normal region corresponding to the abnormal region of the one captured image.

Figure 6:
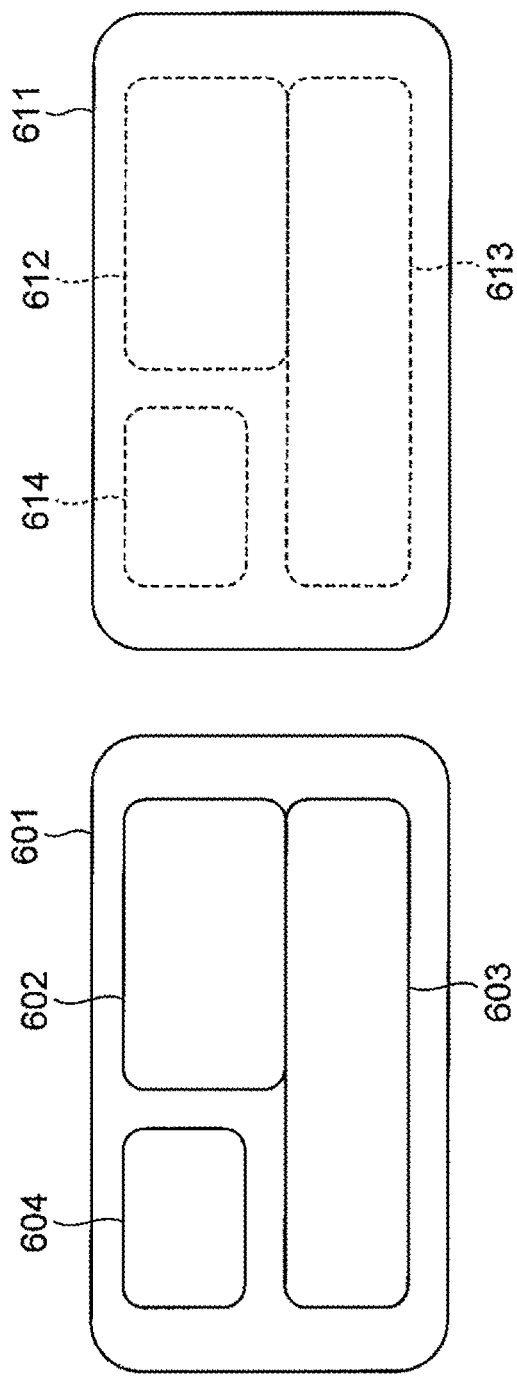
FIG. 6 is a schematic diagram of one captured image having an abnormal region and a normal region.

FIG. 6 is a schematic diagram of one captured image having an abnormal region and a normal region. One captured image 601 has normal regions 602, 603 that are normally imaged and an abnormal region 604 with a stain having a degree of impact equal to or larger than the threshold value. The other captured image 611 is clean and has normal regions 612 to 614 corresponding to the regions 602 to 604 of the one captured image 601.

In such a case, an object recognition process by stereoscopic vision is performed using the normal regions 602, 603 of the one captured image 601 and the normal regions 612, 613 of the other captured image 611. Then, for the abnormal region 604 of the one captured image 601, the object recognition process by monocular vision is performed using an image of the normal region 614 of the other captured image 611 corresponding to the abnormal region 604 of the one captured image 601.

According to the above-described object recognition process, a parallax calculation can be performed between the normal regions 602, 603 and the other captured image 611. Therefore, a normal path for performing the object recognition by stereoscopic vision can be left for part of the one captured image 601 that has become abnormal. Therefore, the function can be maintained at a level according to damage at a time of abnormality.

Note that in the above-described example, the case where the abnormal region exists only in the one captured image 601 has been described, but the present invention is not limited to this, and can also be applied in a case where an abnormal image is present in both one captured image 601 and the other captured image 611. For example, when the region 604 of the one captured image 601 and the region 612 of the other captured image 611 are both abnormal regions, the object recognition by monocular vision may be performed for the region 604 of the one captured image 601 by using the normal region 614 of the other captured image, and the object recognition by monocular vision may be performed for the region 612 of the other captured image 611 by using the normal region 602 of one captured image.

Figure 7:
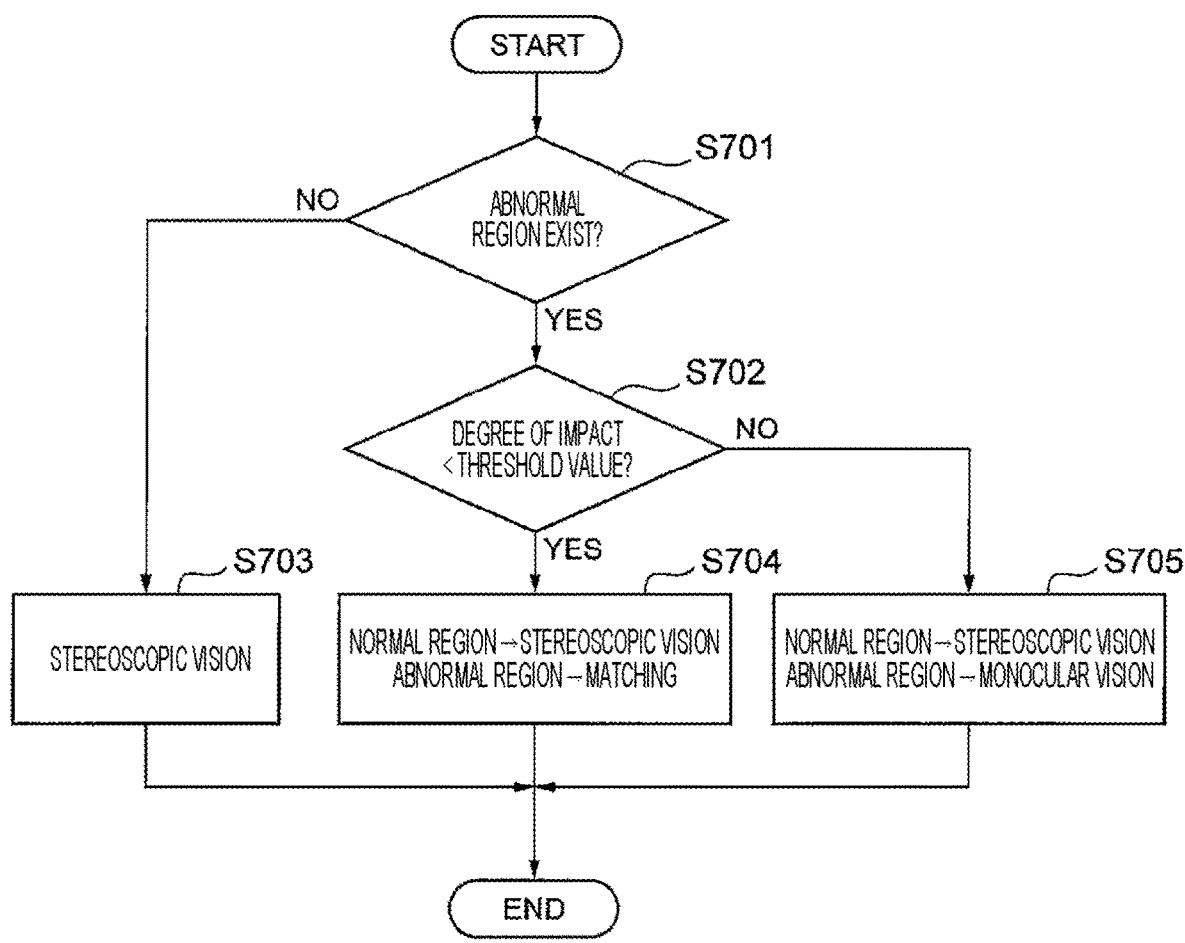
FIG. 7 is a flowchart describing another example of the object recognition process.

FIG. 7 is a flowchart describing another example of the object recognition process, which corresponds to FIG. 5. A feature of this example is that when a captured image has an abnormality, the object recognition process for the abnormal region is changed according to the degree of impact.

For example, in step S701, it is determined whether or not an abnormal region is present. Then, when no abnormal region is present (NO in S701), the process proceeds to step S703 to execute a first object recognition process, and object recognition by stereoscopic vision using a pair of captured images is performed. Then, when the abnormal region exists (YES in S701), the process proceeds to step S702 and thereafter in order to diagnose the degree of impact.

In step S702, it is determined whether or not the degree of impact is smaller than a threshold value set in advance, and if it is diagnosed that the degree of impact is smaller than the threshold value set in advance (YES in S702), the process proceeds to step S704 so as to execute a second object recognition process. If it is diagnosed that the degree of impact is equal to or more than the threshold value (NO in S702), the process proceeds to step S705 so as to execute a third object recognition process.

In step S704, the object recognition by stereoscopic vision is performed on normal regions with each other. Then, for the abnormal region, the position of the three-dimensional object is measured by a process different from the stereoscopic vision of the normal region. Examples of the different process include a method of matching by a texture correlation process and a method of matching by edge information or a gradient of brightness. For example, when one captured image has an abnormal region having a degree of impact smaller than the threshold value, matching is performed on a normal region of the other captured image corresponding to the abnormal region.

In step S705, the object recognition by stereoscopic vision is performed on normal regions with each other. Then, for the abnormal region, the object recognition by monocular vision using only the other captured image that is normal is performed. For example, when one captured image has an abnormal region having a degree of impact equal to or more than a threshold value, the object recognition by monocular vision is performed on a normal region of the other captured image corresponding to the abnormal region. In the object recognition process, if an object is detected in the abnormal region in step S704 or step S705, a table is created that is complemented by placing the object in the position of the abnormal region.

Figure 9:
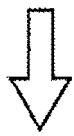
FIG. 9 is a diagram describing an example of a table when an abnormal region exists.

FIG. 8 is a diagram describing an example of a table that is operating normally, and FIG. 9 is a diagram describing an example of a table when an abnormal region exists. For example, when it is determined in step S701 that there is no abnormal region and the object recognition by stereoscopic vision is performed in step S703, the table illustrated in FIG. 8 is created. The table illustrated in FIG. 8 illustrates information of objects recognized by stereoscopic vision, and object IDs (1) to (5), three-dimensional coordinate positions of the respective objects, and sizes of the respective objects are detected.

Further, when the abnormal region exists only in one captured image, the object IDs (3), (4) are undetected only by the object recognition by stereoscopic vision, and the table is as illustrated in FIG. 9(a). In this example, the abnormal region is subjected to the matching and object recognition by monocular vision and is complemented. As for the complemented object IDs (3), (4), their positions Xa3, Ya3, Za3, Xa4, Ya4, Za4 and sizes Sa2, Sa4 are put in the table, as illustrated in FIG. 9(b).

Figure 10:
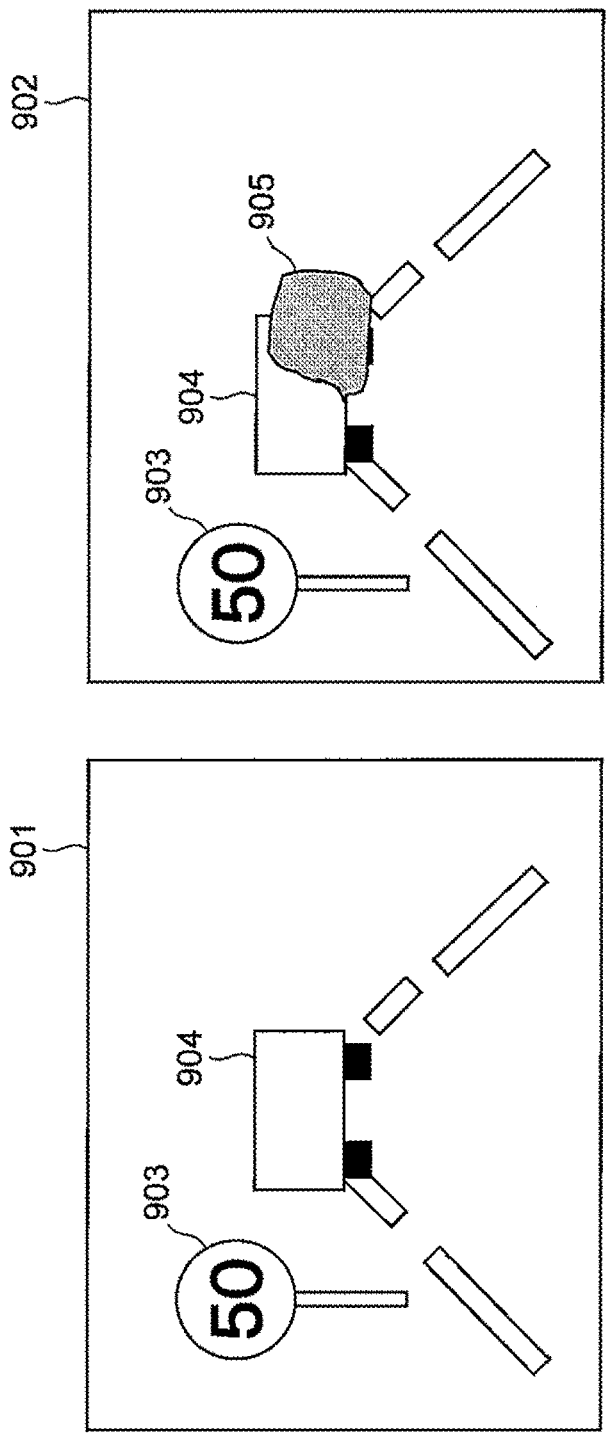
FIG. 10 is a schematic view of a left image and a right image when an abnormal region exists.
Figure 11:
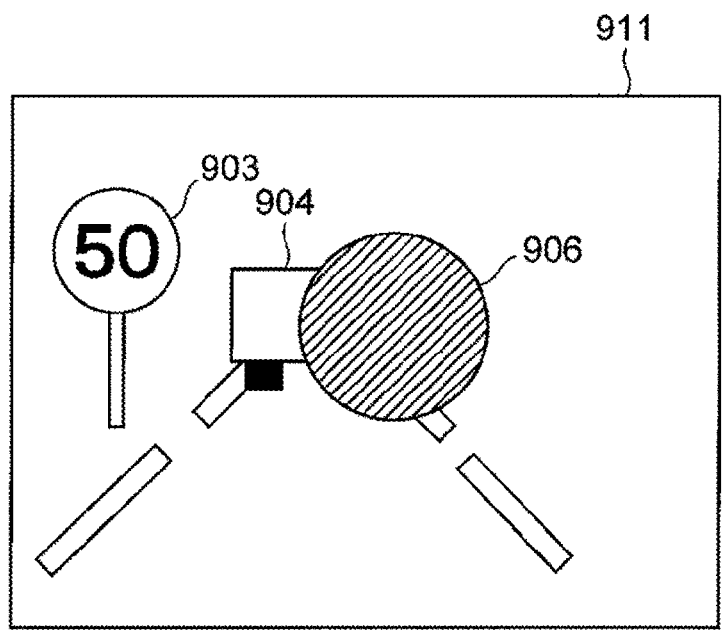
FIG. 11 is a schematic view of a parallax image by stereoscopic vision.
Figure 12:
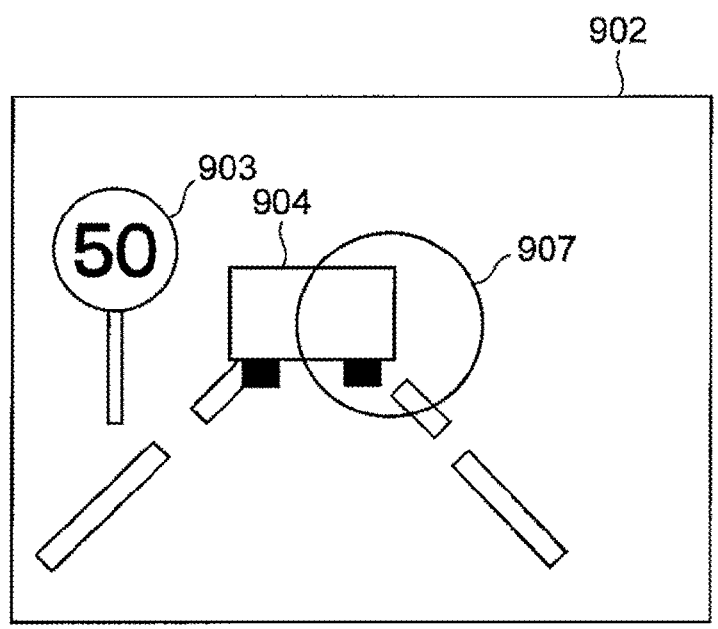
FIG. 12 is a schematic view illustrating a complementary state of the abnormal region by monocular vision.

FIG. 10 is a schematic view of a left image and a right image when an abnormal region exists, FIG. 11 is a schematic view of a parallax image by stereoscopic vision, and FIG. 12 is a schematic view illustrating a complementary state of the abnormal region by monocular vision.

The left image 901 and the right image 902 include a road sign 903, which is arranged on a side of a driving lane of the own vehicle and indicates a speed limit, and a preceding vehicle 904 that travels in front of the own vehicle in the same direction as the own vehicle. Then, a part of the preceding vehicle 904 included in the right image 902 is completely hidden by a mud stain 905 attached to the imaging unit on the right side. Therefore, as illustrated in FIG. 11, when the object recognition by stereoscopic vision is performed, distances from the own vehicle, that is, positions are acquired for the road sign 903 and a part of the preceding vehicle 904 that are normal regions, and the object detection is possible. However, position cannot be acquired for the abnormal region 906 hidden by the mud stain 905.

On the other hand, in the present example, as illustrated in FIG. 12, the left captured image 901 is used to complement the abnormal region of the right captured image 902, so as to generate an image 907 of the stained and hidden part of the right captured image 902. The image 907 is generated, for example, by processing the left captured image 901 and estimating the size of the preceding vehicle 904. Then, as illustrated in FIG. 12, the object recognition is performed using the right captured image 902 and the left captured image 901 in which the abnormal region is complemented.

FIG. 13 is a diagram describing a method of switching a hardware configuration at a time of abnormality.

The in-vehicle stereo camera has a first processing circuit unit that performs processing to calculate a parallax of the pair of captured images, calculate distance information in the captured images based on the parallax, and detect an object based on the distance information as the object recognition by stereoscopic vision, and a second processing circuit unit that performs processing to extract a feature point in the captured images and identify an object based on the feature point as the object recognition by monocular vision. The first processing circuit unit constitutes the first object recognition unit illustrated in FIG. 1, and the second processing circuit unit constitutes the second object recognition unit illustrated in FIG. 1.

The in-vehicle stereo camera of this embodiment has hardware such as a CPU, a memory, and an FPGA circuit. As illustrated in FIG. 13, the hardware includes an image input circuit 1301, an affine circuit 1302, and a left-right image parallax calculation circuit 1303 as circuits for performing the object recognition by stereoscopic vision at a normal time, and an object is detected by performing a parallax (three-dimensional information) process by the CPU by software. Then, at a time of abnormality, the left-right image parallax calculation circuit 1303 is switched to the feature extraction circuit 1304 as a circuit that performs the object recognition by monocular vision, and an object is detected by an identification process (software process) by machine learning for feature points by the CPU.

In the present example, by changing a use configuration of hardware, switching is performed to one of a configuration that executes the object recognition process by stereoscopic vision and a configuration that executes the object recognition process by monocular vision. For example, when one of the captured images is abnormal, the object recognition process by stereoscopic vision is stopped and switched to the object recognition process by monocular vision. At that time, (1) rewriting a stereoscopic vision processing circuit of the FPGA circuit to a hardware accelerator for monocular vision processing, (2) changing the usage area of the memory, and (3) changing a use configuration of the CPU (multi-core configuration or the like) are performed. Therefore, it is possible to save the hardware used only at a time of abnormality and reduce the hardware scale.

Although the embodiments of the present invention have been described in detail above, the present invention is not limited to the above-described embodiments, and various changes in design can be made without departing from the spirit of the present invention described in the claims. For example, the above-described embodiments are described in detail to explain the present invention in an easy-to-understand manner, and are not necessarily limited to one having all the described configurations. Further, part of the configuration of one embodiment can be replaced with a configuration of another embodiment, and a configuration of another embodiment can be added to the configuration of one embodiment. Moreover, it is possible to add, delete, and replace other configurations for part of the configurations of the respective embodiments.

REFERENCE SIGNS LIST 301 left image
302 right image
303 stain
601 one captured image
602, 603 normal region
604 abnormal region
611 other captured image
612 to 614 normal region
901 left image
902 right image
903 road sign
904 preceding vehicle
905 mud stain
s201 captured image acquisition process (captured image acquisition unit)
s202 abnormality detection process (degree-of-impact diagnosis unit)
s203 object recognition process (object recognition unit)

The invention claimed is:

1. An in-vehicle stereo camera, comprising:
   a controller configured to:
   acquire a pair of captured images captured by a pair of imaging units so that both contain an overlapping region;
   perform an object recognition process that recognizes an object using the pair of captured images;
   determine whether or not an abnormal region exists in at least one of the pair of captured images and diagnose, when the abnormal region exists, a degree of impact exerted by the abnormal region on the object recognition process, wherein the degree of impact is based on a size and a transparency of a stain in the at least one of the pair of captured images;
   change a processing content of the object recognition process according to the degree of impact; and
   in response to diagnosing that the abnormal region exists in either one of the pair of captured images and the degree of impact is equal to or higher than a threshold value, perform the object recognition process by monocular vision using only the other of the pair of captured images.

2. The in-vehicle stereo camera according to claim 1, wherein the controller is further configured to:
   perform object recognition by stereoscopic vision using the pair of captured images in response to diagnosing that the abnormal region does not exist in either of the pair of captured images, or diagnosing that the degree of impact is smaller than the threshold value set in advance.

3. The in-vehicle stereo camera according to claim 1, wherein the controller is further configured to:
   perform object recognition by stereoscopic vision using the pair of captured images in response to diagnosing that the abnormal region does not exist in either of the pair of captured images, or diagnosing that the degree of impact is smaller than a threshold value set in advance, and
   perform, in response to diagnosing that the abnormal region exists in the one of the pair of captured images and the degree of impact is equal to or higher than the threshold value:
   object recognition by stereoscopic vision using an image of a normal region excluding the abnormal region from the one of the pair of captured images, and the other of the pair of captured images; and
   object recognition by monocular vision using an image that is the other of the pair of captured images and is of a region corresponding to the abnormal region.

4. The in-vehicle stereo camera according to claim 2, wherein the controller is further configured to:
- perform processing to calculate a parallax of the pair of captured images, calculate distance information in the captured images based on the parallax, and detect an object based on the distance information as the object recognition by stereoscopic vision; and
- perform processing to extract a feature point in the captured images and identify an object based on the feature point as the object recognition by monocular vision.

5. The in-vehicle stereo camera according to claim 2, wherein by changing a use configuration of hardware, switching is performed to either one of a configuration that executes the object recognition process by stereoscopic vision and a configuration that executes the object recognition process by monocular vision.

6. The in-vehicle stereo camera of claim 1, wherein in determining whether the abnormal region exists, the controller is configured to calculate a difference between a first stain in a first image of the pair of captured images and a second stain in a second image of the pair of captured images, and determine whether one of the first stain or the second stain is attached to one of the pair of imaging units.

* * * * *